(12) United States Patent
Negishi et al.

(10) Patent No.: US 6,388,376 B1
(45) Date of Patent: May 14, 2002

(54) ELECTRON EMISSION DEVICE WITH ELECTRON SUPPLY LAYER HAVING REDUCED RESISTANCE

(75) Inventors: Nobuyasu Negishi; Takuya Hata; Atsushi Yoshizawa; Hideo Satoh; Takashi Yamada; Takashi Chuman; Shingo Iwasaki; Takamasa Yoshikawa; Hiroshi Ito; Kiyohide Ogasawara, all of Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/369,145

(22) Filed: Aug. 5, 1999

(30) Foreign Application Priority Data

Aug. 10, 1998 (JP) .......................................... 10-225837

(51) Int. Cl.$^7$ .................................................. H01J 1/312
(52) U.S. Cl. ........................................ 313/496; 313/310
(58) Field of Search ................................. 313/306, 308, 313/310, 311, 495, 496, 497, 309

(56) References Cited

U.S. PATENT DOCUMENTS

| 5,202,605 A | * | 4/1993 | Kaneko et al. | 313/310 |
| 5,347,292 A | * | 9/1994 | Ge et al. | 313/309 |
| 5,569,974 A | * | 10/1996 | Morikawa et al. | 313/310 |
| 5,744,396 A | * | 4/1998 | Chiou et al. | 438/501 |

* cited by examiner

Primary Examiner—Michael H. Day
(74) Attorney, Agent, or Firm—Sughrue Mion, PLLC

(57) ABSTRACT

An electron emission device comprises an electron-supply layer made of metal or semiconductor and disposed on an ohmic electrode; an insulator layer formed on the electron-supply layer; and a thin-film metal electrode formed on the insulator layer. The electron-supply layer is essentially composed of elements belonging to group IV and contains an additive of at least one material selected from atomic elements belonging to group III or V.

8 Claims, 9 Drawing Sheets

ELECTRON EMISSION DEVICE WITH ELECTRON SUPPLY LAYER HAVING REDUCED RESISTANCE

BACKGROUND OF THE INVENTION

1. Field of the Invention

The present invention relates generally to an electron emission device, and more particularly to an electron emission display device which has a plurality of electron emission devices arranged in an image display array, for example, in a matrix form.

2. Description of the Related Art

Conventionally, in field electron emission display apparatuses, a Field Emission Display (FED) is known as a planar emission display device equipped with an array of cold cathode electron emission sources which does not require cathode heating. The emission principle of, for example, an FED using Spindt-type cold cathodes of minute protrusions is as follows. Its emission principle is like a Cathode Ray Tube (CRT), although this FED has a cathode array of Spindt-type protrusions which is different from that of CRT. In the FED, electrons are drawn into a vacuum space by means of each gate electrode spaced apart from the Spindt-type cathode, and the electrons are made to impinge upon the fluorescent substance that is coated on a transparent anode, thereby causing light emission.

This FED, however, has a problem of low production yield because the manufacture of the minute Spindt-type emitter arrays as a cold cathode is complex and involves many processes.

There is also known an electron emission device with electron emission devices of metal-insulator-metal (MIM) structure as a planar electron emission source. The electron emission device with the MIM structure comprises an Al underlayer as a base electrode, an $Al_2O_3$ insulator layer with about 10 nm thickness, and a Au overlayer, as a top electrode with about 10 nm thickness which are formed in order on the substrate. In the case that this MIM device is placed under an opposing electrode in a vacuum, when a voltage is applied between the Al underlayer and the Au overlayer and, at the same time, an acceleration voltage is applied to the opposing electrode, then some of electrons emit out of the Au overlayer and reach the opposing electrode.

However, even the electron emission device with the MIM structure does not yet provide a sufficient amount of emitted electrons.

To overcome these disadvantages of emission of the MIM device, it is conventionally considered that there is a necessity to make the $Al_2O_3$ insulator layer thinner by about several nanometers and make the $Al_2O_3$ insulator layer with a uniform quality so that the interface between the $Al_2O_3$ insulator layer and the Au overlayer is more uniform.

To provide a thinner and more uniform insulator layer, for example, an attempt has been made to control the anodized current by using an anodization method thereby to improve the electron emission characteristics, as in the invention described in Japanese Patent Application kokai No. Hei 7-65710.

However, even an electron emission device with the MIM structure which is manufactured by this anodization method ensures an emission current of about $1\times10^{-5}$ A/cm² and an electron emission efficiency of about $1\times10^{-3}$.

Furthermore, for application of the electron emission device to various practical embodiments, it is necessary to seal the electron emission device with a high vacuum by using a heating treatment. Therefore the electron emission device will be subjected to the heating treatment under a high temperature at 300 to 500 centigrade degrees. Such a high temperature during the heating treatment increases the electric resistance of layer in the device to make the electron emission characteristic of the device inferior.

OBJECT AND SUMMARY OF THE INVENTION

The present invention has been made in view of the above circumstances, and thus an object thereof is to provide an electron emission device having an electron emitting efficiency high enough to stably emit electrons at a low voltage applied thereto, and moreover a display apparatus including a flat panel display device which employs a plurality of such electron emission devices.

Moreover another object of the present invention is to provide an electron emission device capable of restricting the increase of the electric resistance of layer caused by the heating treatment.

The present invention provides an electron emission device which comprises:

an electron-supply layer made of semiconductor;
an insulator layer formed on the electron-supply layer; and
a thin-film metal electrode formed on the insulator layer,
characterized in that said electron-supply layer is essentially composed of elements belonging to group IV and has an additive of at least one material selected from atomic elements belonging to group III or V, whereby the electron emission device emits electrons when an electric field is applied between the electron-supply layer and the thin-film metal.

According to the electron emission device having the structure mentioned above, said insulator layer is made of dielectric and has a film thickness of 50 nm or greater.

According to the electron emission device having the structure mentioned above, said additive is included at a ratio ranging from 0.1 to 10 atm % in the electron-supply layer.

The present invention further provides an electron emission display device which comprises:

a pair of a first substrate and an optically transparent second substrate opposing to each other with a vacuum space interposed therebetween;
a plurality of electron emission devices formed on said first substrate, each of which including an electron-supply layer made of semiconductor formed on ohmic electrodes formed on said first substrate, an insulator layer formed on said electron-supply layer, and a thin-film metal electrode formed on said insulator layer and facing the vacuum space, wherein said electron-supply layer is essentially composed of elements belonging to group IV and has an additive of at least one material selected from atomic elements belonging to group III or V;
a collector electrode formed on said second substrate; and
a fluorescent material layer formed on said collector electrode and facing the vacuum space.

In the electron emission display device according to the invention, said insulator layer is made of dielectric and has a film thickness of 50 nm or greater.

In the electron emission display device according to the invention, said additive is included at a ratio ranging from 0.1 to 10 atm % in the electron-supply layer.

In the electron emission display device according to the invention, the display device further comprises plural insulative support members formed on said first substrate and disposed between adjacent ones of said electron emission devices so as to enclose the electron emission devices for partitioning them, wherein the distance from said first substrate to the surfaces of said insulative support members proximate to said vacuum space is substantially equal to the distance from said first substrate to the surface of said thin-film metal electrodes proximate to said vacuum space.

In the electron emission display device according to the invention, the display device further comprises a plurality of bus electrodes, each of which is arranged in a stripe form to electrically connect adjacent ones of said thin-film metal electrodes, wherein said ohmic electrodes and said electrodes are stripe-like electrodes and arranged to extend perpendicular to each other.

In the electron emission display device according to the invention, said first substrate includes a plurality of first insulative ramparts, each of which disposed between said electron emission devices and protruding into said vacuum space, whereas said second substrate includes a plurality of second ramparts each of which protrudes into said vacuum space to abut to said first ramparts.

According to the electron emission device of the invention with the above structure, the device comprises an electron-supply layer made of semiconductor, particularly elements belonging to group IV and having an additive of at least one material selected from atomic elements belonging to group III or V in the periodic table such as boron (B), phosphorus (P), to arsenic (As), antimony (Sb) and so on. Therefore, even when the plural electron emission devices used in a flat panel display device are subjected to a high temperature atmosphere in the manufacturing process, the devices can keep their properties before and after the heating treatment without thermal deterioration due to the high temperature.

Moreover, through-bores are not likely to be produced in the insulator layer because of its relatively thick thickness and therefore its production yield is improved. The electron emission device of the invention is a planar or spot-like electron emission diode and can be adapted to high speed devices such as a source of a pixel vacuum tube or bulb, an electron emission source of a scanning or transmission electron microscope, a vacuum-micro electronics device and the like. In addition, this electron emission device can serve as a minute microwave tube or a diode which emits electromagnetic waves with millimeter or sub-millimeter wavelength, and also can serve as a high speed switching device.

DETAILED DESCRIPTION OR THE PREFERRED EMBODIMENTS

An electron emission device according to an embodiment of the present invention will be described in more detail with reference to the accompanying drawings.

Figure 1:
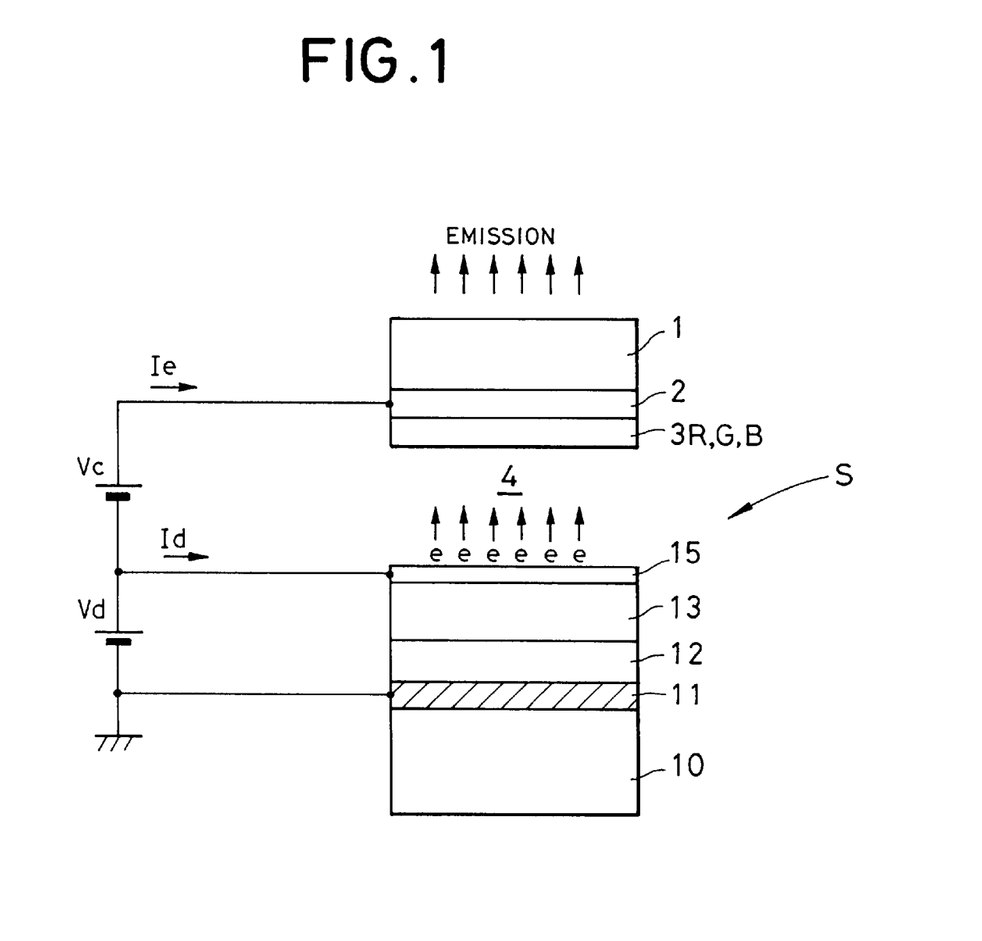
FIG. 1 is a schematic cross-sectional view of an electron emission device according to an embodiment of the present invention.

As illustrated in FIG. 1, one electron emission device "S" constructed in a stack configuration comprises; an ohmic electrode 11 made of aluminum (Al), tungsten (W), titanium nitride (TiN), copper (Cu), chromium (Cr) or the like on a first substrate 10 made of a glass or the like; an electron-supply layer 12 made of semiconductor such as silicon (Si) or the like on the ohmic electrode 11; an insulator layer 13 made of dielectric such as $SiO_x$ (X=0.1 to 2.0) or the like on the electron-supply layer 12; and a thin-film metal electrode 15 made of metal such as platinum (Pt), gold (Au) or the like facing a vacuum space on the insulator layer 13. Particularly, the insulator layer 13 is deposited in considerably thicker thicknesses so as to have a thickness of 50 nm or greater. Further, an additive material selected from atomic elements belonging to group III in the periodic table such as boron (B) or from atomic elements belonging to group V in the periodic table such as phosphorus (P), arsenic to (As), antimony (Sb) and so on is added to the electron-supply layer 12.

These layer are formed through the sputtering method by using a gas of Ar, Kr or Xe or a mixture thereof, or a gas mixture essentially consisting of one of those rare gases with $O_2$, $N_2$ or the like mixed therein, under the sputtering conditions of a gas pressure of 0.1 to 100 mTorr, preferably 0.1 to 20 mTorr and the forming rate of 0.1 to 1000 nm/min, preferably 0.5 to 100 nm/min.

In case that the first substrate 10 carrying plural electron emission devices i.e., device substrate or back substrate is used for a display device, a second substrate i.e., front substrate 1 made of glass and the substrate 10 are supported apart from one another in parallel by a spacer and sealed to face each other with a vacuum space 4 interposed therebetween. On the inner surface of the front substrate 1, at lest one transparent collector electrode 2 of, for example, an indium tin oxide (so-called ITO), tin oxide (SnO), zinc oxide (ZnO) or the like, is formed. The transparent collector electrode traps emitted electrons. The transparent collector electrodes may be arranged in groups of three in association with red (R), green (G) and blue (B) color signals in order to provide a color display panel, and voltages are applied to those three collector electrodes respectively. The transparent collector electrodes are separately coated with fluorescent materials 3R, G, B which are capable of emitting lights of R, G and B corresponding to the three primary colors of light respectively. A black stripe masks BM or back metal layer may be provided on the front substrate 1 between the fluorescent material layers 3R, G, B. Alternatively the collector electrode 2 may be formed integrally as a monolithic film for a mono chromed is play panel. The material for the back substrate 10 is not limited to glass, and ceramics such as $Al_2O_3$, $Si_3N_4$ and BN etc. may be used instead of glass.

This electron emission device "S" can be regarded as a diode of which the thin-film metal electrode 15 at its surface is connected to a positive applied voltage Vd and the ohmic electrode 11 is connected to a ground potential as shown in FIG. 1. When the voltage Vd for example approximately 90 volt is applied between the ohmic electrode 11 and the thin-film metal electrode 15 to supply electrons into the electron-supply layer 12, a diode current Id flows. Since the insulator layer 13 has a high resistance, most of the applied electric field is applied and concentrated to the insulator layer 13. The electrons travel in the insulator layer 13 toward the thin-film metal electrode 15. Some of the electrons that reach near the thin-film metal electrode 15 pass through the thin-film metal electrode 15, due to the strong electric field, to be emitted out into the vacuum space.

The electrons "e" (emission current Ie) discharged from the thin-film metal electrode 15 are soon accelerated by a high voltage Vc for example approximately 5 kilovolt which is applied to an opposing collector electrode 2 (transparent electrode), and are collected with the collector electrode 2. When a fluorescent substance 3 is coated on the collector electrode 2, corresponding visible light is observed.

An effective main component material for the electron-supply layer 12 of the electron emission device is silicon (Si) and particularly amorphous silicon (so-called a-Si), further particularly the hydrogenated amorphous silicon (a-Si:H) in which almost of the dangling bonds of a-Si are terminated by hydrogen atoms is effective. In addition, hydrogenated amorphous silicon carbide (a-SiC:H) in which parts of Si atoms are replaced by carbon atoms (C) is also effectively used for the electron-supply layer 12. Moreover hydrogenated amorphous silicon nitride (a-SiN:H) in which parts of Si atoms are replaced by nitrogen atoms (N) may be also effectively used for the electron-supply layer 12. In addition, silicon doped with boron, aluminium, gallium, phosphorus, indium, arsenic and/or antimony may be used for the electron-supply layer 12. In addition to Si, an elemental semiconductor or a compound semiconductor of an element of a group IV such as a germanium (Ge), germanium silicon compound (Ge—Si), silicon carbide (SiC)is also used as a main component for the electron-supply layer 12 of the electron emission device as well.

The electron-supply layer 12 contains the additive material selected from atomic elements consisting of B, Al, Ga, In and Tl belonging to group IIIb in the periodic table and P, As, Sb and Bi belonging to group Vb in the periodic table at a ratio ranging from 0.1 to 10 atm %. The added additive material to the electron-supply layer 12 increases donors and acceptors to raise the density of carriers. It can be understood that, by this addition of additive to the electron-supply layer, the descent of electric resistance caused by increasing of dangling bonds of Si is offset.

Silicon oxide $SiO_x$ (wherein subscripted x represents an atomic ratio) is effective as the dielectric material of and, metal oxides or metal nitrides such as $LiO_x$, $LiN_x$, $NaO_x$, $KO_x$, $RbO_x$, $CsO_x$, $BeO_x$, $MgO_x$, $MgN_x$, $CaO_x$, $CaN_x$, $SrO_x$, $BaO_x$, $ScO_x$, $YO_x$, $YN_x$, $LaO_x$, $LaN_x$, $CeO_x$, $PrO_x$, $NdO_x$, $SmO_x$, $EuO_x$, $GdO_x$, $TbO_x$, $DyO_x$, $HoO_x$, $ErO_x$, $TmO_x$, $YbO_x$, $LuO_x$, $TiO_x$, $ZrO_x$, $ZrN_x$, $HfO_x$, $HfN_x$, $ThO_x$, $VO_x$, $VN_x$, $NbO_x$, $TaO_x$, $TaN_x$, $CrO_x$, $CrN_x$, $MoO_x$, $MoN_x$, $WO_x$, $WN_x$, $MnO_x$, $ReO_x$, $FeO_x$, $FeN_x$, $RuO_x$, $OsO_x$, $CoO_x$, $RhO_x$, $IrO_x$, $NiO_x$, $PdO_x$, $PtO_x$, $CuO_x$, $CuN_x$, $AgO_x$, $AuO_x$, $ZnO_x$, $CdO_x$, $HgO_x$, $BO_x$, $BN_x$, $AlO_x$, $AlN_x$, $GaO_x$, $GaN_x$, $InO_x$, $SiN_x$, $GeO_x$, $SnO_x$, $PbO_x$, $PO_x$, $PN_x$, $AsO_x$, $SbO_x$, $SeO_x$, $TeO_x$ and the like can be used as well for the insulator layer 13.

Furthermore, metal complex oxides such $LiAlO_2$, $Li_2SiO_3$, $Li_2TiO_3$, $Na_2Al_{22}O_{34}$, $NaFeO_2$, $Na_4SiO_4$, $K_2SiO_3$, $K_2TiO_3$, $K_2WO_4$, $Rb_2CrO_4$, $Cs_2CrO_4$, $MgAl_2O_4$, $MgFe_2O_4$, $MgTiO_3$, $CaTiO_3$, $CaWO_4$, $CaZrO_3$, $SrFe_{12}O_{19}$, $SrTiO_3$, $SrZrO_3$, $BaAl_2O_4$, $BaFe_{12}O_{19}$, $BaTiO_3$, $Y_3Al_5O_{12}$, $Y_3Fe_5O_{12}$, $LaFeO_3$, $La_3Fe_5O_{12}$, $La_2Ti_2O_7$, $CeSnO_4$, $CeTiO_4$, $Sm_3Fe_5O_{12}$, $EuFeO_3$, $Eu_3Fe_5O_{12}$, $GdFeO_3$, $Gd_3Fe_5O_{12}$, $DyFeO_3$, $Dy_3Fe_5O_{12}$, $HoFeO_3$, $Ho_3Fe_5O_{12}$, $ErFeO_3$, $Er_3Fe_5O_{12}$, $Tm_3Fe_5O_{12}$, $LuFeO_3$, $Lu_3Fe_5O_{12}$, $NiTiO_3$, $Al_2TiO_5$, $FeTiO_3$, $BaZrO_3$, $LiZrO_3$, $MgZrO_3$, $HfTiO_4$, $NH_4VO_3$, $AgVO_3$, $LiVO_3$, $BaNb_2O_3$, $NaNbO_3$, $SrNb_2O_6$, $KTaO_3$, $NaTaO_3$, $SrTa_2O_6$, $CuCr_2O_4$, $Ag_2CrO_4$, $BaCrO_4$, $K_2MoO_4$, $Na_2MoO_4$, $NiMoO_4$, $BaWO_4$, $Na_2WO_4$, $SrWO_4$, $MnCr_2O_4$, $MnFe_2O_4$, $MnTiO_3$, $MnWO_4$, $CoFe_2O_4$, $ZnFe_2O_4$, $FeWO_4$, $CoMoO_4$, $CoTiO_3$, $CoWO_4$, $NiFe_2O_4$, $NiWO_4$, $CuFe_2O_4$, $CuMoO_4$, $CuTiO_3$, $CuWO_4$, $Ag_2MoO_4$, $Ag_2WO_4$, $ZnAl_2O_4$, $ZnMoO_4$, $ZnWO_4$, $CdSnO_3$, $CdTiO_3$, $CdMoO_4$, $CdWO_4$, $NaAlO_2$, $MgAl_2O_4$, $SrAl_2O_4$, $Gd_3Ga_5O_{12}$, $InFeO_3$, $MgIn_2O_4$, $Al_2TiO_5$, $FeTiO_3$, $MgTiO_3$, $NaSiO_3$, $CaSiO_3$, $ZrSiO_4$, $K_2GeO_3$, $Li_2GeO_3$, $Na_2GeO_3$, $Bi_2Sn_3O_9$, $MgSnO_3$, $SrSnO_3$, $PbSiO_3$, $PbMoO_4$, $PbTiO_3$, $SnO_2$—$Sb_2O_3$, $CuSeO_4$, $Na_2SeO_3$, $ZnSeO_3$, $K_2TeO_3$, $K_2TeO_4$, $Na_2TeO_3$, $Na_2TeO_4$ and the like can be used as well for the insulator layer 13. And still furthermore, sulfides such as FeS, $Al_2S_3$, MgS, ZnS and the like, fluorides such as LiF, $MgF_2$, $SmF_3$ and the like, chlorides such as HgCl, $FeCl_2$, $CrCl_3$ and the like, bromides such as AgBr, CuBr, $MnBr_2$ and the like, iodide such as $PbI_2$, CuI, $FeI_2$ and the like and metal oxidized nitrides such as SiAlON and the like can be used as well for the insulator layer 13.

Moreover, carbon such as diamond, Fullerene ($C_{2n}$) and the like or metal carbide such as $Al_4C_3$, $B_4C$, $CaC_2$, $Cr_3C_2$, $Mo_2C$, MoC, NbC, SiC, TaC, TiC, VC, $W_2C$, WC, ZrC and the like are also effective as the dielectric material of the insulator layer 13. Fullerene ($C_{2n}$) consists of carbon atoms. The representative $C_{60}$ is a spherical surface basket molecule as known a soccer ball molecule. There is also known $C_{32}$ to $C_{960}$ and the like. The subscribed x in $O_x$, $N_x$ and the like in the above chemical formulas represent atomic ratios and also herein after.

The film thickness of the insulator layer 13 may be 50 nm or greater preferably in ranging from 100 to 1000 nm.

Metals Pt, Au, W, Ru and Ir are effective as the material for the thin-film metal electrode 15 on the electron emission side. In addition, Be, C, Al, Si, Sc, Ti, V, Cr, Mn, Fe, Co, Ni, Cu, Zn, Ga, Y, Zr, Nb, Mo, Tc, Rh, Pd, Ag, Cd, In, Sn, Ta, Re, Os, Ti, Pb, La, Ce, Pr, Nd, Pm, Sm, Eu, Gd, Tb, Dy, Ho, Er, Tm, Yb, Lu and the like can be used as well for the thin-film metal electrode.

Although sputtering is particularly effective in the fabrication of those layers and the substrate, vacuum deposition, CVD (Chemical Vapor Deposition), laser ablation, MBE (Molecular Beam Epitaxy) and ion beam sputtering are also effective.

Electron emission devices according to the invention each comprising an electron-supply layer made of Si to which boron was added were fabricated as embodiments and their characteristics were examined concretely.

First, an ohmic electrode of 300 nm thick of TiN was deposited on each of plural back substrates of glass by sputtering. Various electron-supply layers of a-Si to which boron (B) were added at rates of 0.02 atm %, 0.15 atm %, 0.340 atm %, 0.44 atm %, 1.00 atm % and 10.00 atm % were deposited with a thickness of 5.0 μm, by sputtering, on the electrode surfaces of the substrates respectively. Then, an insulator layer of $SiO_x$ was deposited with a thickness of 400 nm on the electron-supply layer of each substrate. Finally, a thin-film metal electrode of Pt was deposited with a thickness of 10 nm on the surface of the amorphous $SiO_x$ layer of each substrate by sputtering, thus providing plural device substrates.

Meanwhile, transparent substrates of glass were prepared as front substrates, on each of which an ITO collector electrode was firstly formed on a transparent glass substrate and a fluorescent layer of a fluorescent substance corresponding to color emission was secondly formed on the collector electrode.

Electron emission devices were assembled in each of which the device substrate and the front substrate were supported apart from one another by 10 mm in parallel by a spacer in such a way that the thin-film metal electrode faced the collector electrode, with the clearance therebetween made to a vacuum of $10^{-7}$ Torr or $10^{-5}$ Pa, thus providing plural electron emission display devices. The electric properties of the electron emission devices were measured at room temperature.

Next, the plural resultant devices were heated or baked at temperatures of 200° C., 300° C., 400° C., 500° C. and 600° C. in a vacuum atmosphere for one hour respectively in order to compare the properties between the electron emission devices at a 25° C. (room temperature), i.e., non-heated devices and the devices heated at various temperatures and then cooled.

Figure 2:
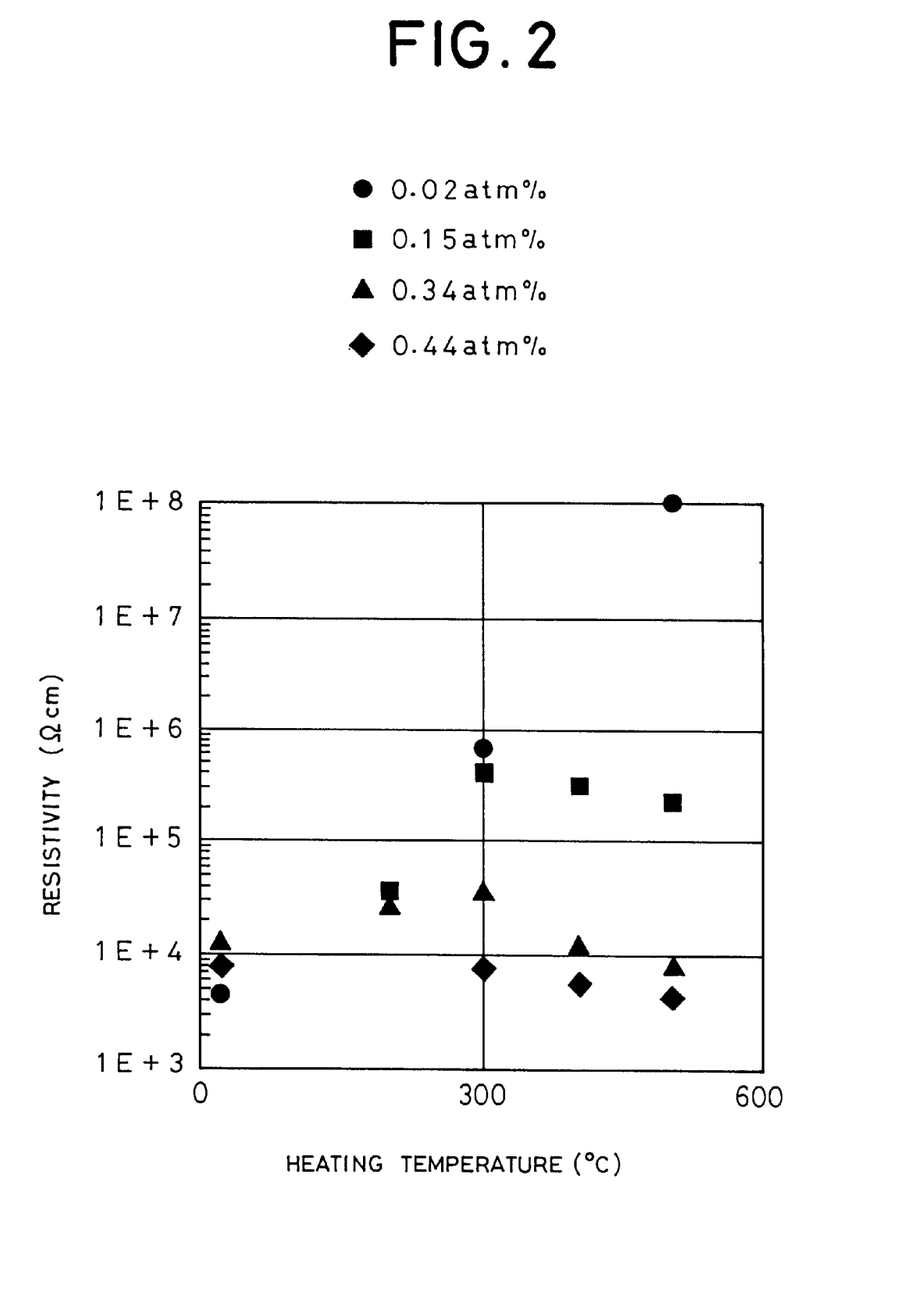
FIG. 2 is a graph showing a relationship between the resistivities of a-Si electron-supply layers of the electron emission devices and the temperatures at which the devices are baked or heated in the heating treatment of the process for manufacturing the electron emission display device according to to the invention.

Then, after heating treatment of devices, they were cooled down at room temperature. Then, the resistivities of the heated and cooled plural devices were measured correspondingly to the baked temperatures. FIG. 2 shows the relationship between the resistivities of a-Si electron-supply layers of the resultant devices and the temperatures at which the device were baked or heated in the heating treatments of the manufacturing process. In FIG. 2, the plots of ● represent the resistivities of the devices each having the a-Si electron-supply layer to which boron is added at 0.02 atm %, in which the resistivities thereof rapidly to increase as the baked temperature rises. The plots of ■, ▼ and ♦ represent the resistivities of the a-Si electron-supply layers to which boron are added at 0.15 atm %, 0.34 atm % and 0.44 atm % respectively, in which these devices apparently keep their resistivities restricted even after heating of the 300° C. temperature or more.

Figure 3A:
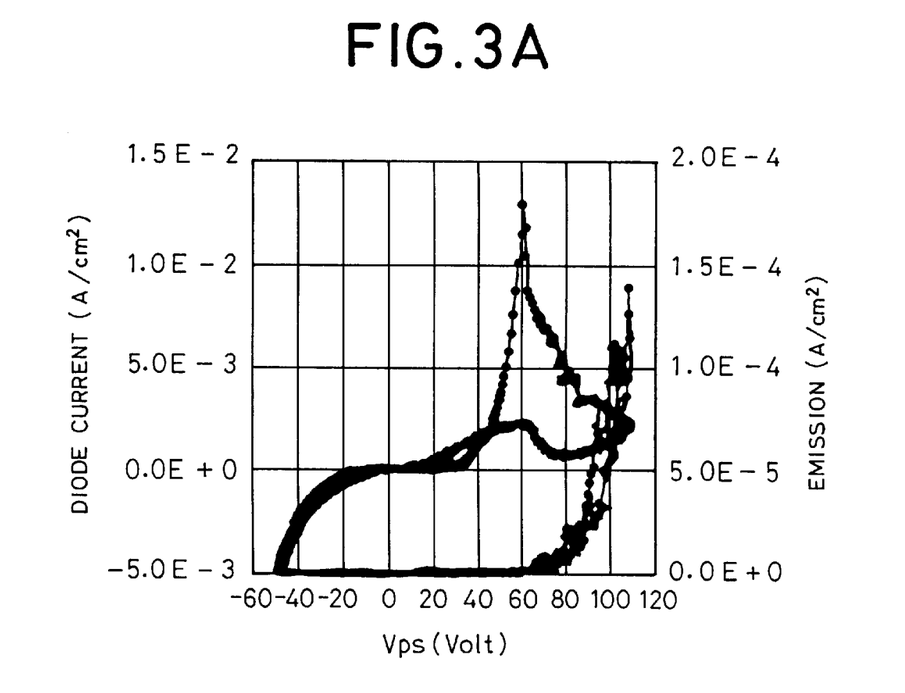
FIGS. 3A and 3B are graphs illustrating relationships of the Diode current Id and the Emission current with respect to the Driving voltage Vd applied to the electron emission device having an electron-supply layer to which a boron additive is added at 0.02 atm % in an embodiment according to the invention before and after the heating treatment respectively.
Figure 3B:
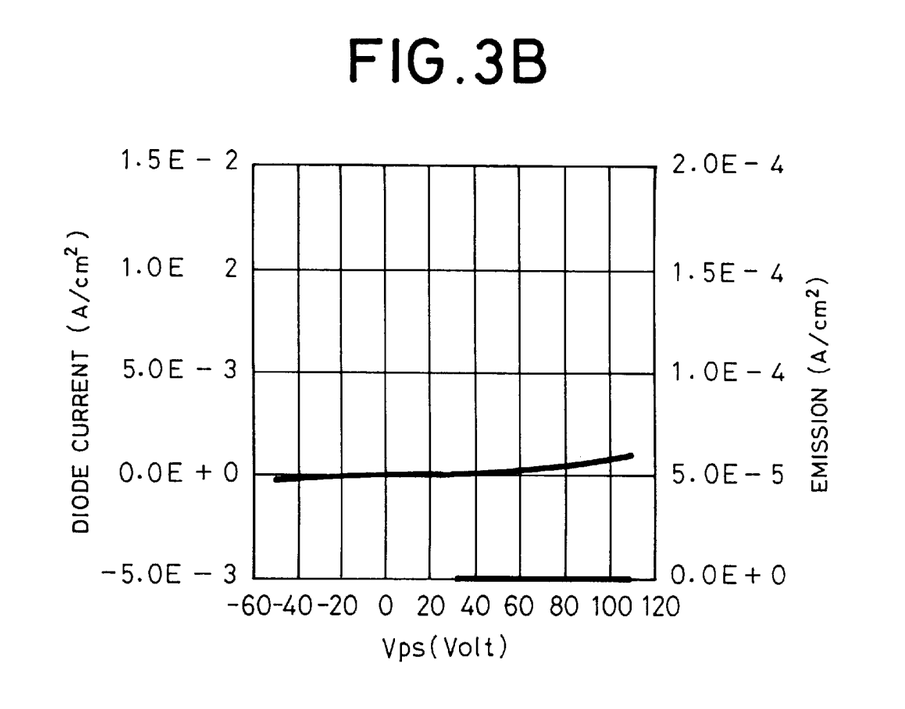
Figure 4A:
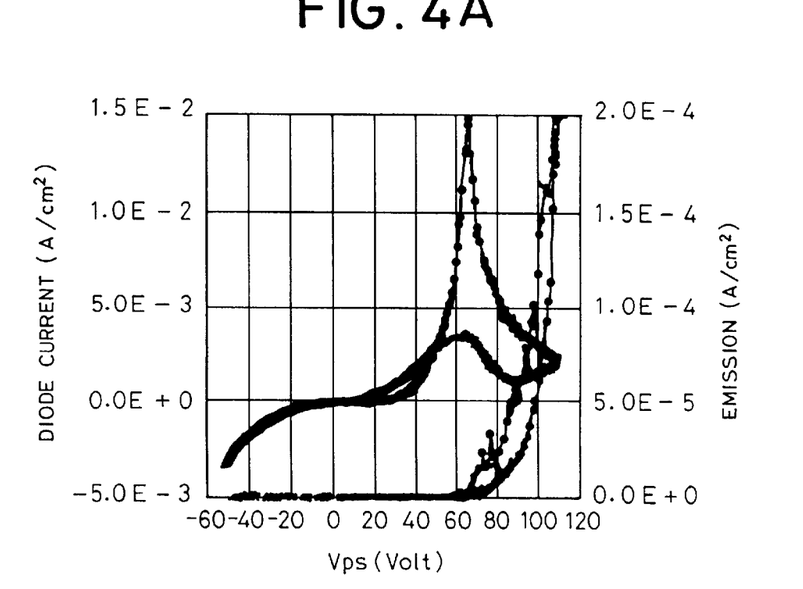
FIGS. 4A and 4B are graphs illustrating relationships of the Diode current Id and the Emission current Ie with respect to the Driving voltage Vd applied to the electron emission device having an electron-supply layer to which a boron additive is added at 0.34 atm % in another embodiment according to the invention before and after the heating treatment respectively.
Figure 4B:
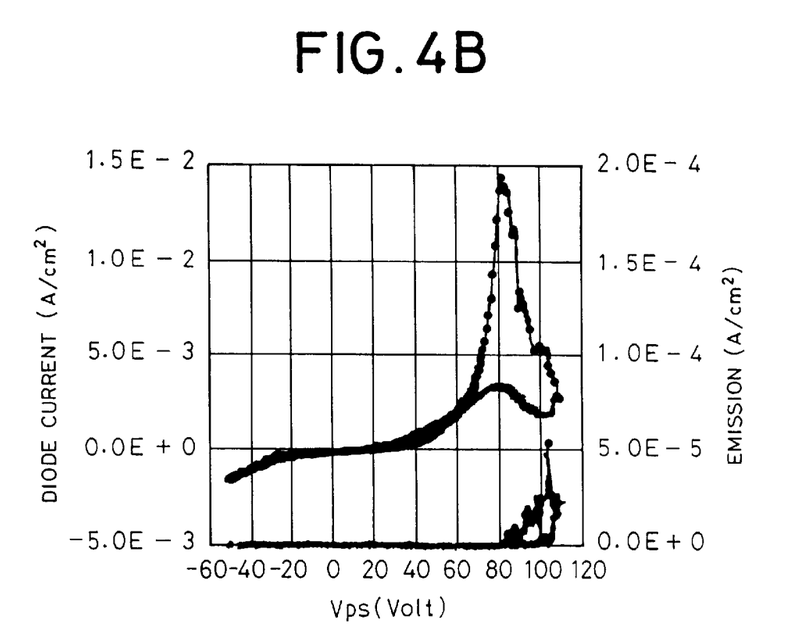
Figure 5:
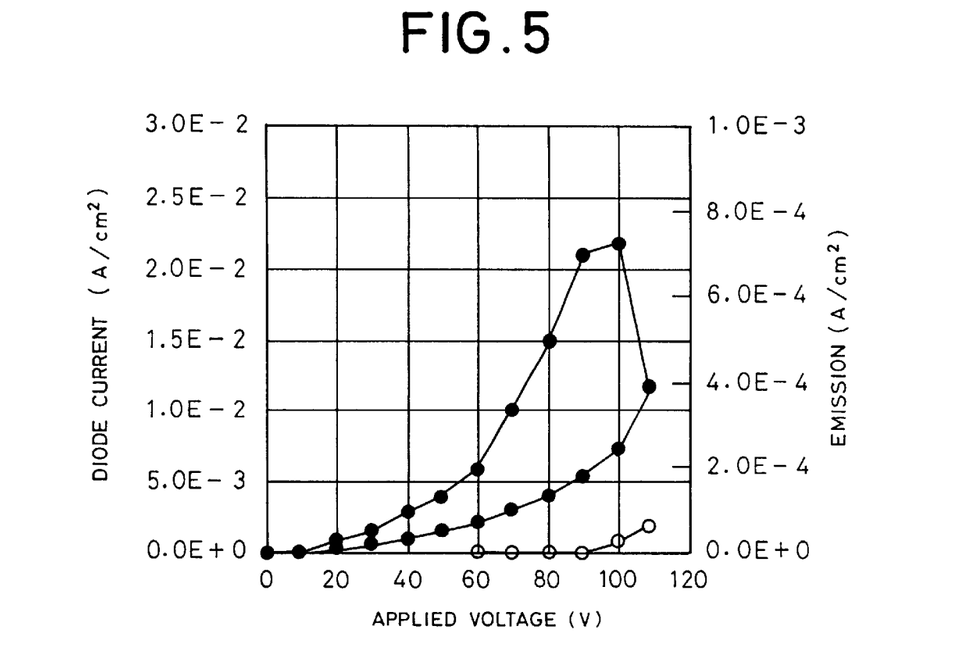
FIGS. 5 to 8 are graphs illustrating relationships of the Diode current Id and the Emission current Ie with respect to the Driving voltage Vd applied to the electron emission devices having electron-supply layers to which boron additives are added at 0.15 atm %, 0.34 atm %, 0.44 atm %, and 1.00 atm % in other embodiments according to the invention after the heating treatment respectively.
Figure 6:
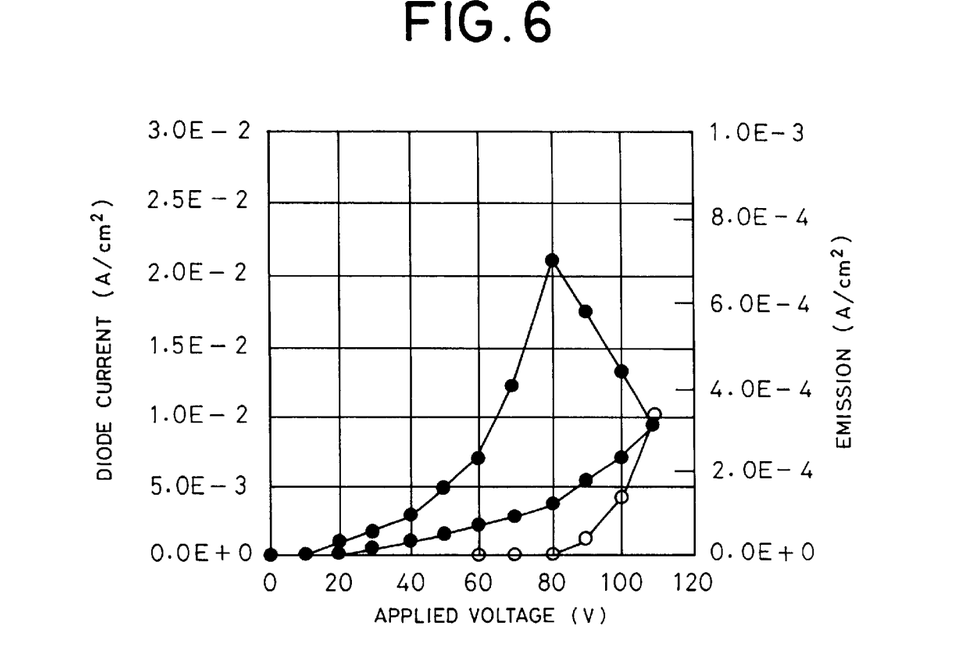
Figure 7:
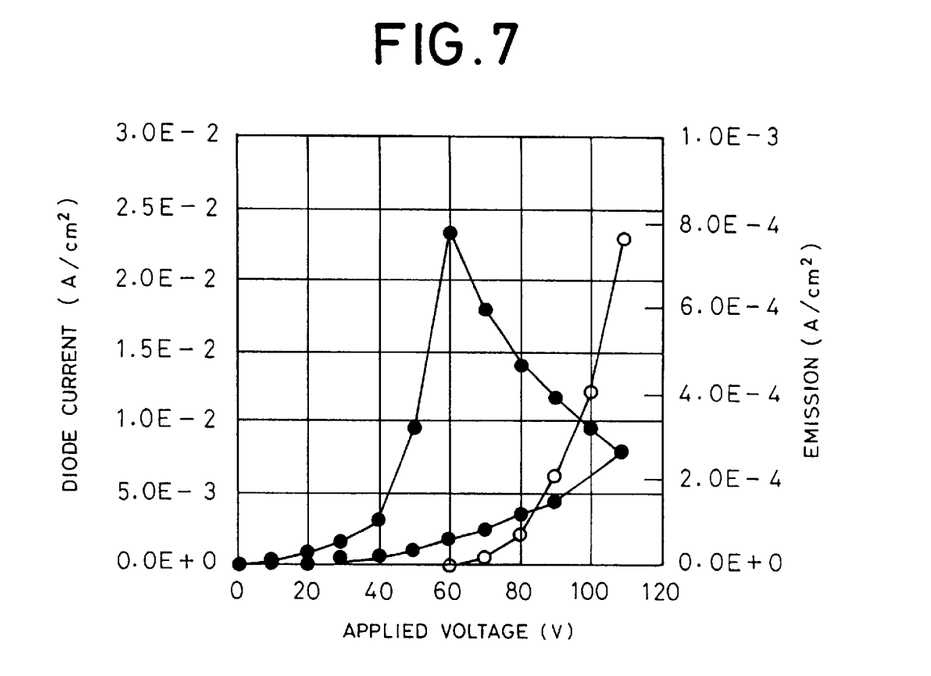
Figure 8:
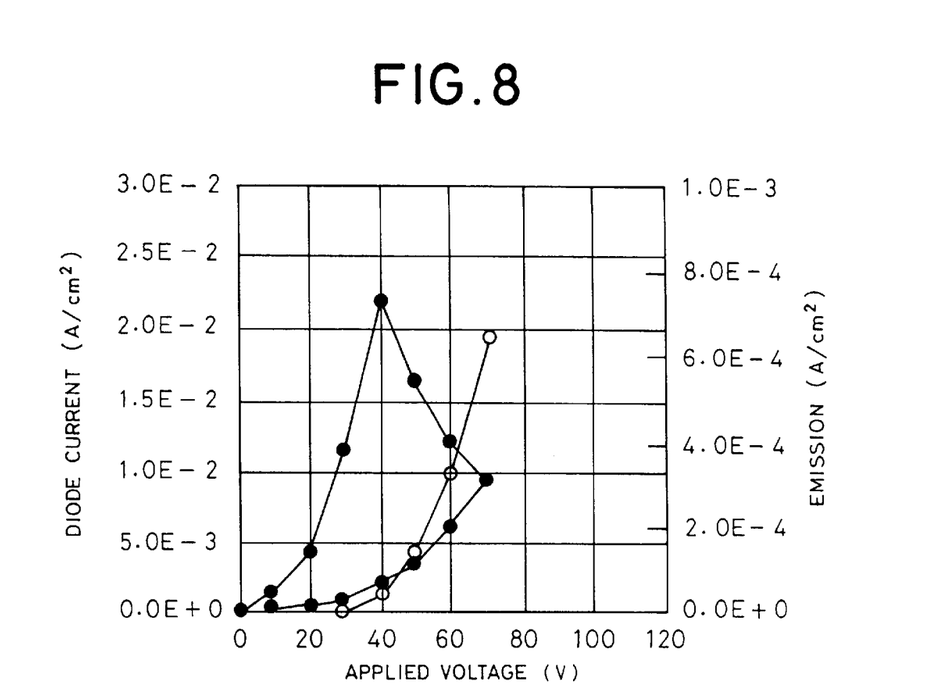

Further, the Diode current Id and Emission current Ie of the device before and after the heating treatments (25° C. and 300° C.) were measured, while a driving voltage Vps ranging from −50 to 110V is applied between the thin-film metal electrode and the ohmic electrode of each device having the electron-supply layer to which boron is added. For example, FIGS. 3A and 3B illustrate the resultant measured characteristics of the device having the electron-supply layer to which boron is added at 0.02 atm % corresponding to plots ● in FIG. 2 obtained before and after the heating treatments respectively. And FIGS. 4A and 4B illustrate the resultant measured characteristics of the device having the electron-supply layer to which boron is added at 0.34 atm % corresponding to plots ▼ in FIG. 2 obtained before and after the heating treatments respectively. In these figures, the curvatures rising at about 80V represent characteristics of Emission current, and the other curvatures represent characteristics of Diode current. FIGS. 3A and 4A show characteristics of the devices measured before the heating treatments respectively. FIGS. 3B and 4B show characteristics of the devices measured after the heating treatments respectively. As seen form FIGS. 3A and 3B, it is understood that the diode current hardly flows because the electron-supply layer has a high electric resistance due to the heating treatment in case that the density of added Boron to the electron-supply layer is low. On the other hand, as seen form FIGS. 4A and 4B, in case that the density of added Boron to the electron-supply layer is higher than 0.02 atm %, the electron emission devices can keep substantially the same properties before and after the heating treatment.

Moreover, the devices having the electron-supply layers to which boron were added at the density rates of 0.15 atm %, 0.34 atm %, 0.44 atm % and 1.00 atm % were heated at a temperature 400° C. for one hour respectively, and after that, the devices were cooled down at room temperature. Then, Diode current Id and Emission current Ie of the resultant devices were measured in such a manner that a driving voltage ranging from 0 to 110V is applied between the thin-film metal electrode and the ohmic electrode of the each device. FIG. 5, FIG. 6, FIG. 7 and FIG. 8 show the resultant values Id and Ie of the devices having the electron-supply layers to which boron were added at the density rates of 0.15 atm %, 0.34 atm %, 0.44 atm % and 1.00 atm % respectively. In these figures, plots ○ rising at about 90V, 80V, 70V and 40V represent Emission current characteristics respectively, and the other plots ● represent Diode current characteristics. As seen from these figures, it is understood that the electron emission devices each having the boron added electron-supply layer and heated at 400° C. for one hour and then cooled can keep substantially the same properties before and after the heating to treatment similarly to the heating treatment of the device preformed at 300° C. In addition, it was confirmed that the electron emission devices each having boron added at a density rate of 10.00 atm % and heated at 400° C. for one hour and then cooled can keep substantially the same properties before and after the heating treatment, by means of the measurement of Diode current Id and Emission current Ie that a driving voltage ranging from 0 to 110V is applied each device electron-supply layer.

Figure 9:
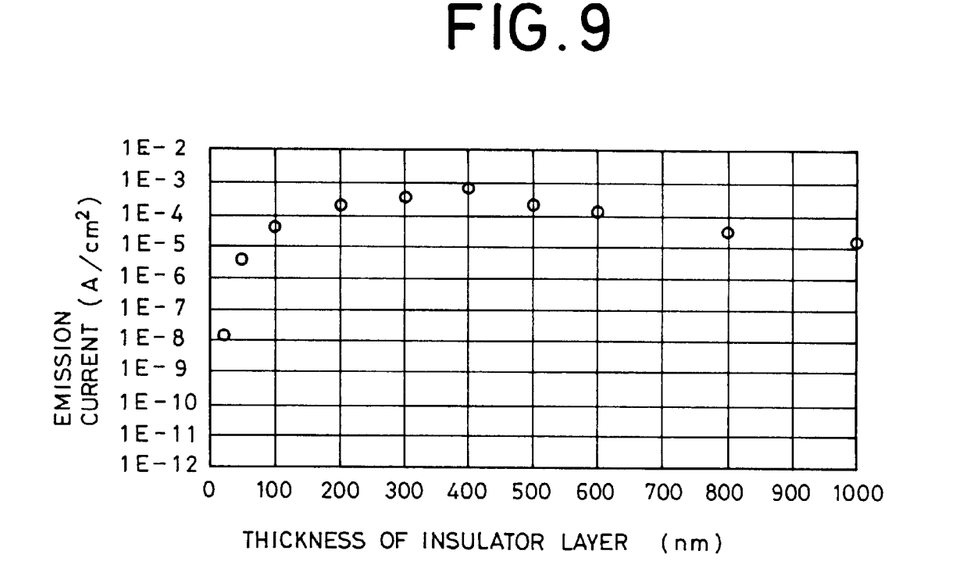
FIG. 9 is a graph showing a relationship between the emission current Ie and the film thickness of the insulator layer in the electron emission device according to the invention.
Figure 10:
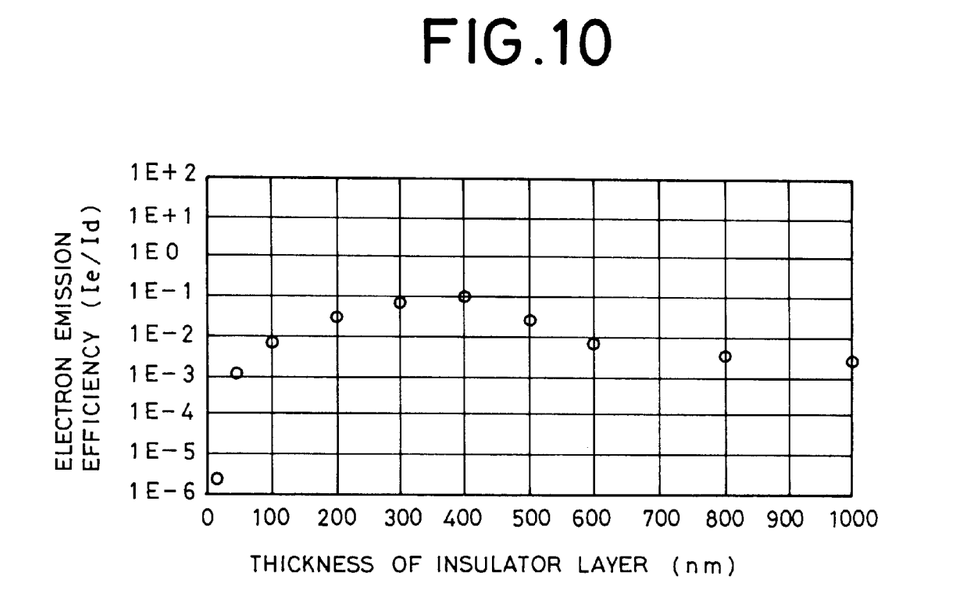
FIG. 10 is a graph showing a relationship between the electron emission efficiency and the film thickness of the insulator layer in the electron emission device according to the invention.

Next, the second embodiments of electron emission devices each having the electron-supply layer to which boron was added at a density rate of 0.44 atm % were fabricated in the same manner as the first embodiments excepting that an insulator layer 13 of $SiO_x$ was deposited while changing the film thickness thereof in a range of 25 nm, 50 nm, 100 nm, 200 nm, 300 nm, 400 nm, 500 nm, 600 nm, 800 nm, 1000 nm. Then, the electron emission devices of the second embodiments were heated or baked at temperatures of 400° C. in a vacuum atmosphere for one hour and then cooled down to room temperature respectively. After that, the emission current Ie and the electron emission efficiency (Ie/Id) in the heated and cooled plural devices were measured correspondingly to the thicknesses of insulator layer, when a driving voltage Vd of 110 V was applied to the prepared electron emission devices. The results are illustrated in FIGS. 9 and 10 showing the Vd variations of the emission current Ie and the electron emission efficiency (Ie/Id) respectively with respect to the film thickness ranging from 25 nm to 1000 nm of the insulator layer of the devices. As apparent from FIG. 9, the devices whose insulator layer had a thickness of from 50 nm to 1000 nm shows the emission current of about $1 \times 10^{-6}$ A/cm$^2$ or more. As apparent from FIG. 10, the devices whose insulator layer had a thickness of from 50 nm to 1000 nm shows the electron emission efficiency of about $1 \times 10^{-3}$.

There were observations of the surface of the SiO$_x$ insulator layer resulted form the oxidation of the electron supply layer by a scanning electron microscope (SEM) during the above formation process, grain surface each having an about 20 nm diameter appeared. The grain structure of SiO$_x$ of the insulator layer seems to cause the peculiar phenomenon that the passing current flows through the insulator layer which has a thickness of 50 nm or greater.

Figure 11:
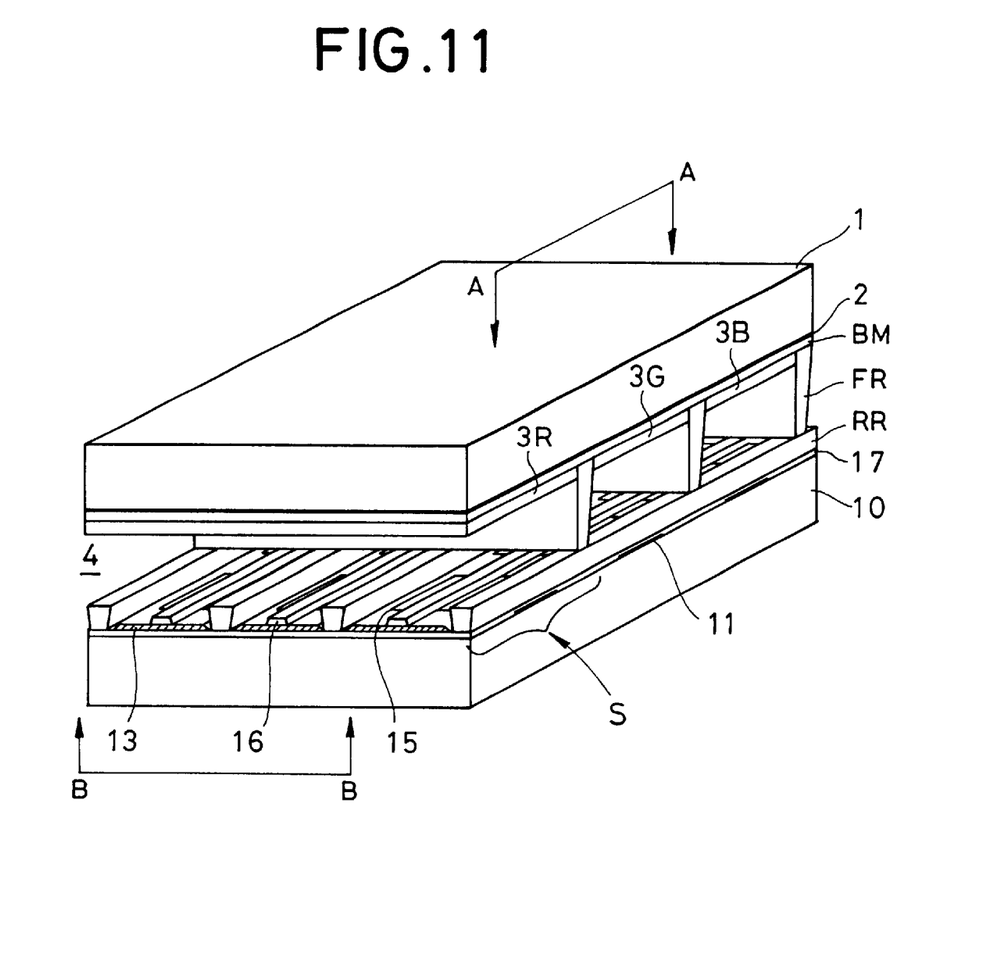
FIG. 11 is a schematic partial perspective view illustrating an electron emission display device according to an embodiment of the present invention.

FIG. 11 illustrates an embodiment of an electron emission display device comprising ramparts or ribs are formed therein and a plurality of electron emission devices arranged in a matrix form as an image display array. The illustrated electron emission display device comprises a pair of a front substrate 1 of optically transparent and a back substrate 10 made of glass or the like. Rear ramparts or ribs RRs formed on the back substrate 10 abut to front ramparts or ribs FRs formed on the front substrate 1 at the top surfaces thereof so that both the substrates are placed apart from and parallel to each other with a vacuum space 4 interposed therebetween.

A plurality of ohmic electrodes 11 extending in parallel with each other are formed on the inner surface of the back substrate 10 proximately to the vacuum space 4. The ohmic to electrodes 11 are grouped into sets of three corresponding to R (red), G (green), B (blue) color signals to provide a color display panel, and are applied with predetermined signals, respectively. On the ohmic electrodes 11, a plurality of electron emission devices S are formed and arranged in a matrix form. On portions of thin-film metal electrodes of adjacent devices, a plurality of bus electrodes 16 extending perpendicular to the ohmic electrodes and in parallel with each other are routed to electrically connect the thin-film metal electrodes. An intersection of an ohmic electrode 11 and a bus electrode 16 corresponds to an electron emission device S. Therefore, a passive matrix scheme or an active matrix scheme may be applied as a driving scheme for the display apparatus of the present invention.

Figure 12:
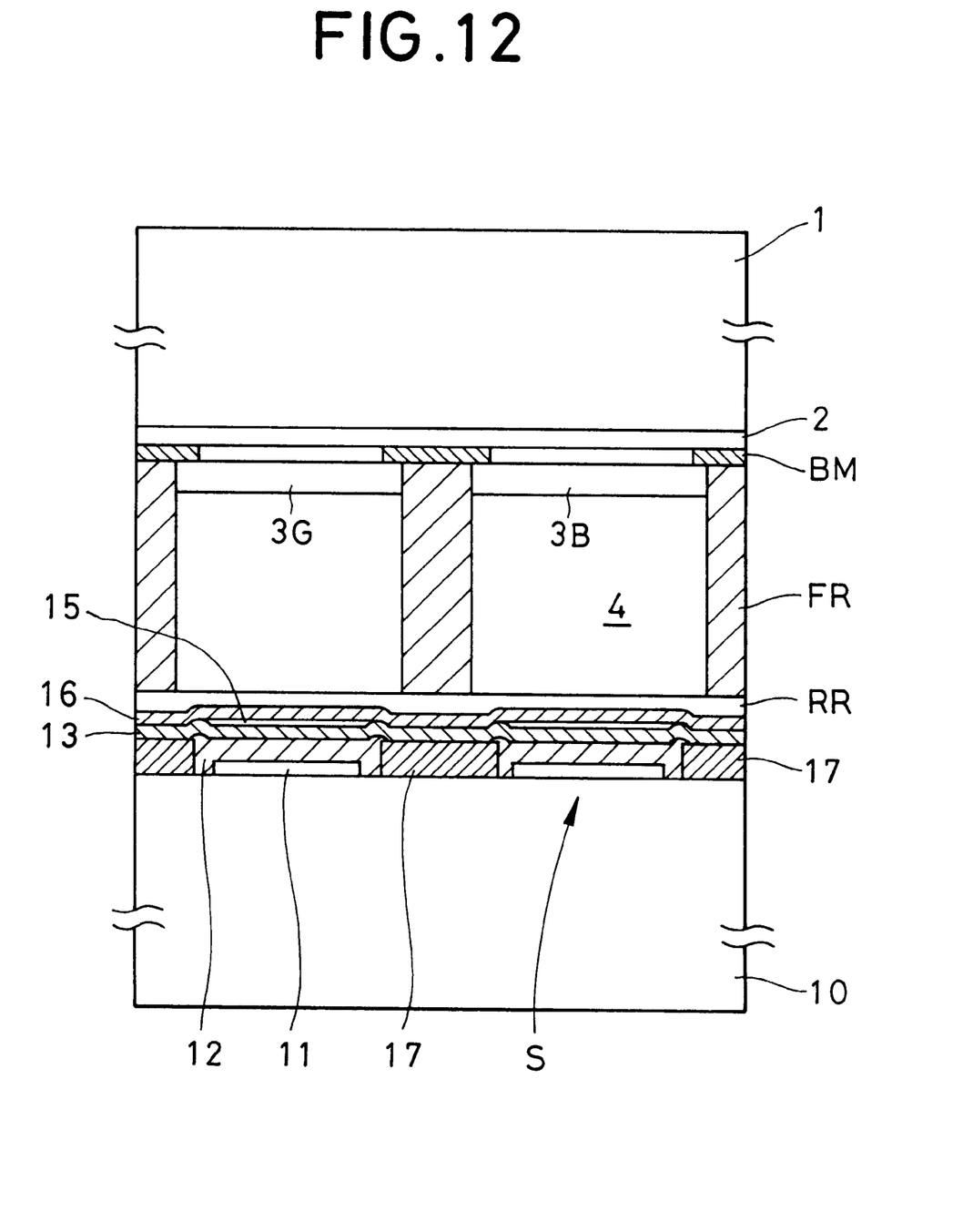
FIG. 12 is a schematic partial enlarged cross-sectional view of the electron emission display device according to the present invention, taken with a line AA in FIG. 11.

As illustrated in FIG. 12, each electron emission device S comprises an electron-supply layer 12, an insulator layer 13 and a thin-film metal electrode 15 formed in this order on the ohmic electrode 11. The thin-film metal electrode 15 faces the vacuum space 4. The electron-supply layer is essentially composed of elements belonging to group IV such as Si and has an additive of at least one material selected from atomic elements belonging to group III such as B at a ratio ranging from 0.1 to 10 atm %.

In particular, an insulative support member 17 is formed to surround each of the electron emission devices S and to define a plurality of electron emitting regions. The insulative support member 17 supports the bus electrodes 16, and prevents line failures. More specifically, as illustrated in FIG. 12, the insulative support member 17 or a material having a large electric resistance is previously formed in peripheral portions except for the electron emission devices in a thickness similar to a final thickness of the electron emission devices when formed in subsequent steps.

Further, in this embodiment, the rear ribs RRs associated with the back substrate 10 is formed on the insulative support member 17 so as to protrude into the vacuum space 4 from the back substrate 10. The ribs RRs are positioned at predetermined intervals. While in FIG. 11, the ribs RRs are formed between respective electron emission devices S, the ribs RRs may be formed at larger intervals, for example, every two or three electron emission devices S. Also, while in FIG. 11, the ribs RRs are continuously formed in a direction substantially perpendicular to the ohmic electrodes 11, the ribs RRs may be intermittently formed so as to leave upper areas including portions abutting to the front ramparts FRs associated with the front substrate 1, but not illustrated.

Preferably, each of the ribs RRs has its top surface area larger than the bottom surface area which is in contact with the back substrate 10. In other words, each of the ribs RR is preferably formed to have an overhung portion on its top which protrudes in a direction substantially parallel with the back substrate 10.

Further, while in FIG. 11, the bus electrodes 16 disposed on the thin-film metal electrodes 15 of the back at substrate 10 are formed in a simple linear shape, the bus electrodes 16 are preferably formed, instead of the linear shape, so as to have a width between the thin-film metal electrodes 15 of the electron emission devices larger than that on the thin-film metal electrodes. In other words, the bus electrodes 16 are preferably formed to be wider between the electron emission devices than on the devices. In this way, the resistance of the bus electrodes can be reduced.

The material for the ohmic electrodes 11 is Au, Pt, Al, W or the like which is generally used for the wires in an IC, and alternatively the ohmic electrodes may be formed as a three layer structure composed of chromium, nickel and chromium layers. Moreover, an alloy of Al—Nd, Al—Mo, or Ti—N may be used for the ohmic electrode material. The ohmic electrodes 11 has a uniform thickness for supplying substantially the same current to the individual devices. In addition, an auxiliary insulator layer comprised of an insulator such as SiO$_2$, SiN$_x$, Al$_2$O$_3$ or AlN may be provided between the back substrate 10 and the ohmic electrode 11, but not shown in FIG. 11. The auxiliary insulator layer serves to prevent an adverse influence of the back substrate 10 on the device (such as elution of an impurity such as an alkaline component or a roughened substrate surface).

From the principle of electron emission, it is better that the material for the thin-film metal electrode 15 has a lower work function ø and is thinner. To increase the electron emission efficiency, the material for the thin-film metal electrode 15 should be a metal of the group I or group II in the periodic table; for example, Cs, Rb, Li, Sr, Mg, Ba, Ca and the like are effective and alloys of those elements may be used as well. To make the thin-film metal electrode 15 very thin, the material for the thin-film metal electrode 15 should be chemically stable with a high conductivity; for example, single substances of Au, Pt, Lu, Ag, Cu and Ir or an alloy thereof or a multi-layer thereof are desirable. It is effective to coat or dope a metal with a low work function as described above on or in those metals.

The material for the bus electrodes 16 can be Au, Pt, Al or the like which is generally used for the wiring of an integrated circuit IC, and should have a thickness enough to supply substantially the same potential to the individual devices, adequately of 0.1 to 50 µm. If the electrical resistance of material of the thin-film metal electrode is allowable for the bus electrodes, such electrode material may be used for the bus electrodes.

On the other hand, transparent collector electrodes 2 made of ITO to which a high voltage is applied are integrally formed on the inner surface (surface opposing to the back substrate 10) of the optically transparent front substrate 1 made of transparent glass and serving as a display surface. In case that a black stripe mask or back metal layer is provided on the Hi front substrate 1, such a conductive layer may be serve as a collector electrode instead of the ITO transparent collector electrode.

On the collector electrodes 2, a plurality of front ribs (second insulative rib) FRs are formed in parallel with the ohmic electrodes 11. On the collector electrodes 2 between the extending front ribs, fluorescent material layers 3R, 3G, 3B made of fluorescent materials corresponding to R, G, B are formed, respectively, in opposition to the vacuum space 4. In this way, the front ribs (second insulative rib) FRs are provided at boundaries of the respective fluorescent materials to maintain a constant distance (for example, 1 mm) between the back substrate and the front substrate. Since the front ribs (second insulative rib) FRs are disposed on the front substrate 1 in a direction orthogonal to the rear ribs (first insulative rib) RRs disposed on the back substrate 10, it is ensured that the front substrate are definitely colored by the fluorescent materials in R, G, B corresponding to the three primary colors of light.

As described above, the electron emission display device according to this embodiment has an image display array composed of a plurality of light emitting pixels which are arranged in a matrix form and each of which includes red (R), green (G) and blue (B) light emitting elements. Of course, a monochrome display panel may be formed by replacing all the RGB light emitting elements with monochrome light emitting elements.

What is claimed is:

1. An electron emission device comprising:
   an electron-supply layer made of semiconductor;
   an insulator layer formed on the electron-supply layer; and
   a thin-film metal electrode formed on the insulator layer,
   wherein said electron-supply layer is essentially composed of elements belonging to group IV and has an additive of at least one material selected from atomic elements belonging to group III or V, and
   wherein said additive is included at a ratio ranging from 0.1 to 10 atm % in the electron-supply layer.

2. The electron emission device as claimed in claim 1, wherein the electron emission device emits electrons when an electric field is applied between the electron-supply layer and the thin-film metal.

3. An electron emission device comprising:
   an electron-supply layer made of semiconductor;
   an insulator layer formed on the electron-supply layer; and
   a thin-film metal electrode formed on the insulator layer,
   wherein said electron-supply layer is essentially composed of elements belonging to group IV and has an additive of at least one material selected from atomic elements belonging to group III or V,
   wherein said insulator layer is made of dielectric and has a film thickness of 50 nm or greater.

4. An electron emission display device comprising:
   a pair of a first substrate and an optically transparent second substrate opposing to each other with a vacuum space interposed therebetween;
   a plurality of electron emission devices formed on said first substrate, each of which including an electron-supply layer made of semiconductor formed on ohmic electrodes formed on said first substrate, an insulator layer formed on said electron-supply layer, and a thin-film metal electrode formed on said insulator layer and facing the vacuum space, wherein said electron-supply layer is essentially composed of elements belonging to group IV and has an additive of at least one material selected from atomic elements belonging to group III or V;
   a collector electrode formed on said second substrate; and
   a fluorescent material layer formed on said collector electrode and facing the vacuum space,
   wherein said additive is included at a ratio ranging from 0.1 to 10% atm % in the electron-supply layer.

5. An electron emission display device according to claim 4 further comprising:
   a plurality of insulative support members formed on said first substrate and disposed between adjacent ones of said electron emission devices so as to enclose the electron emission devices for partitioning them, wherein the distance from said first substrate to the surfaces of said insulative support members proximate to said vacuum space is substantially equal to the distance from said first substrate to the surface of said thin-film metal electrodes proximate to said vacuum space.

6. An electron emission display device according to claim 4 further comprising a plurality of bus electrodes, each of which is arranged in a stripe form to electrically connect adjacent ones of said thin-film metal electrodes, wherein said ohmic electrodes and said electrodes are stripe-like electrodes and arranged to extend perpendicular to each other.

7. An electron emission display device according to claim 4, wherein said first substrate includes a plurality of first insulative ramparts, each of which disposed between said electron emission devices and protruding into said vacuum space, wherein said second substrate includes a plurality of second ramparts each of which protrudes into said vacuum space to abut to said first ramparts.

8. An electron emission display device comprising:
   a pair of a first substrate and an optically transparent second substrate opposing to each other with a vacuum space interposed therebetween;
   a plurality of electron emission devices formed on said first substrate, each of which including an electron-supply layer made of semiconductor formed on ohmic electrodes formed on said first substrate, an insulator layer formed on said electron-supply layer, and a thin-film metal electrode formed on said insulator layer and facing the vacuum space, wherein said electron-supply layer is essentially composed of elements belonging to group IV and has an additive of at least one material selected from atomic elements belonging to group III or V;
   a collector electrode formed on said second substrate; and
   a fluorescent material layer formed on said collector electrode and facing the vacuum space,
   wherein said insulator layer is made of dielectric and has a film thickness of 50 nm or greater.

* * * * *